United States Patent
Ge et al.

(10) Patent No.: US 7,508,757 B2
(45) Date of Patent: Mar. 24, 2009

(54) NETWORK WITH MAC TABLE OVERFLOW PROTECTION

(75) Inventors: An Ge, Plano, TX (US); Girish Chiruvolu, Plano, TX (US); Maher Ali, Richardson, TX (US)

(73) Assignee: Alcatel Lucent, Paris (FR)

( * ) Notice: Subject to any disclaimer, the term of this patent is extended or adjusted under 35 U.S.C. 154(b) by 588 days.

(21) Appl. No.: 11/229,114

(22) Filed: Sep. 16, 2005

(65) Prior Publication Data

US 2006/0083254 A1  Apr. 20, 2006

Related U.S. Application Data

(60) Provisional application No. 60/619,330, filed on Oct. 15, 2004.

(51) Int. Cl.
H04L 12/26 (2006.01)
H04L 12/28 (2006.01)

(52) U.S. Cl. .................. 370/229; 370/252; 370/401

(58) Field of Classification Search ......... 370/229–231, 370/252, 400, 401
See application file for complete search history.

(56) References Cited

U.S. PATENT DOCUMENTS

| | | | |
|---|---|---|---|
| 5,343,471 A | | 8/1994 | Cassagnol et al. |
| 6,031,821 A | * | 2/2000 | Kalkunte et al. ............ 370/235 |
| 6,192,028 B1 | * | 2/2001 | Simmons et al. ............ 370/229 |
| 6,446,131 B1 | * | 9/2002 | Khansari et al. ............ 709/238 |
| 7,009,933 B2 | * | 3/2006 | Gan ............................ 370/226 |
| 7,130,271 B1 | * | 10/2006 | Sekihata ..................... 370/236 |
| 7,274,665 B2 | * | 9/2007 | Kesavan ................... 370/230.1 |
| 2004/0177265 A1 | * | 9/2004 | Ice et al. ..................... 713/200 |
| 2004/0228414 A1 | * | 11/2004 | Keck et al. .............. 375/240.28 |

FOREIGN PATENT DOCUMENTS

EP  1162792 A  12/2001

OTHER PUBLICATIONS

Guruprasad A et al: "Security Features in Ethernet Switches for Access Networks" IEEE Tencon 2003. Conference on Convergent Technologies for the Asia-Pacific Region. Bangalore, India, Oct. 15-17, 2003, IEEE Region 10 Annual Conference, New York, NY; IEEE, US. vol. 4 of 4 Conf. 18, Oct. 15, 2003, pp. 1211-1214, XP010687456.

Recacha F, et al, "Implementation of a secure Bridge in an Ethernet Environment", One World Through Communications, Florence, May 4-8, 1992, Proceedings of the Conference on Computer Communications (INFOCOM), New York, NY, IEEE, US, vol. 2 Conf 11, May 4, 1992, pp. 2343-2350, XP010062271.

* cited by examiner

*Primary Examiner*—Hong Cho

(57) ABSTRACT

A method of operating a bridge node ($B_0$) in a network system. The bridge node comprises a plurality of ports ($BP_{0-x}$). The method comprises a step of receiving a frame (240), from a device in the network system and other than the bridge node, at a port in the plurality of ports. The frame comprises a source network address. The method is also responsive to at least one condition (250, 260) associated with the port in that the method stores the source address in a forwarding table associated with the bridge if the at least one condition is satisfied. The at least one condition comprises whether the frame was received within a time window $T_w$ of when a threshold number of previous frames were received at the port and their respective source network addresses were stored in the table.

29 Claims, 4 Drawing Sheets

NETWORK WITH MAC TABLE OVERFLOW PROTECTION

CROSS-REFERENCES TO RELATED APPLICATIONS

This application claims priority under 35 U.S.C. § 119 of U.S. Provisional Application No. 60/619,330, filed Oct. 15, 2004.

STATEMENT REGARDING FEDERALLY SPONSORED RESEARCH OR DEVELOPMENT

Not Applicable.

BACKGROUND OF THE INVENTION

The present embodiments relate to computer networks and are more particularly directed to a network with MAC table overflow protection.

Ethernet networks have found favor in many applications in the networking industry and for various reasons. For example, Ethernet is a widely used and cost effective medium, with numerous interfaces and speed capability up to the 10+ Gbps range. Ethernet networks may be used in applications that are incorporated at a single location by a single entity such as a company or the like, or the entity as an alternative may couple various local area networks ("LANs") together to form a larger network, sometimes referred to as a wide area network ("WAN"). Still further, Ethernet technology is also often used to form a network sometimes referred to as a Metro Ethernet Network ("MEN"), which is generally a publicly accessible network that is often affiliated with a metropolitan area—hence, the term "Metro" Ethernet. A MEN provides a so-called Metro domain, typically under the control of a single administrator or manager, such as an Internet Service Provider ("ISP"). A MEN is typically used to connect between an access network and a core network. The access network often includes edge nodes that operate as bridges to private or end users, that is, customer nodes, making connectivity to the network. The core network is used to connect to other Metro Ethernet Networks and it provides primarily a frame switching function.

Ethernet networks typically include a number of bridges, sometimes also referred to by other names such as switches. A bridge typically operates to receive a frame, which is sometimes referred to by other names such as a packet or message, which in any event includes a portion, such as a header, with both a source and destination address. The frame may include other information, such as a payload or data that is being communicated from the device at the source address to the device at the destination address. The bridge receives this frame at a port from that source and forwards it via a port to that destination, where both the source and the destination may be another bridge or a user or other node in the Ethernet network. The bridge performs its routing function by developing (or "learning") a table of each address connected and corresponding to each of its ports and then consulting its table later so as to forward a frame to the desired address by forwarding the frame out the port that is indicated in the table as connected to the destination having that address. The table so introduced here is referred to in this document as a MAC address forwarding table, where MAC is an abbreviation for Media Access Control, and each MAC address is a hardware address that uniquely identifies its corresponding piece of hardware in a network. Specifically, in IEEE 802 networks, the Data Link Control ("DLC") layer of the OSI Reference Model is divided into two sublayers, namely: (i) the Logical Link Control ("LLC") layer; and (ii) MAC layer. The MAC layer interfaces directly with the network medium (i.e., the physical layer, or layer 1 in the OSI). Consequently, each different connection to the network medium requires a different MAC address. Ultimately, when the bridge receives a frame, it reads the destination MAC address from the header information in the frame, establishes a temporary connection between the source and destination ports, forwards the frame out its destination port, and then terminates the connection.

An unfortunate development in the heavy use of networks in contemporary computing has been the many efforts of wrongdoers to either cause trouble to the operation of the network or to gain unauthorized access to network resources. In the context of Ethernet networks, one malicious effort has been for a user to connect to the network and then flood a bridge with an unusually large number of frames, thereby adding different and unknown MAC addresses. When the bridge receives each frame, the bridge examines its MAC address forwarding table to determine if the table has the source MAC address in that frame recorded in that forwarding table. If the address is not so recorded, the table stores the address and associates it with the port that received the frame that carried that source address—thus, the source address is thereafter associated with a port on the bridge. Consequently, when a subsequent frame (or frames) is received with a destination address that matches an already-stored MAC address in the forwarding table, the bridge forwards the frame along the port associated with that address. From the preceding, therefore, note that the bridge initially stores into its forwarding table an entry for each source address not already stored in the table. As the number of such unknown source addresses of this sort grows, eventually the storage for them becomes full. At this point, however, and per the prior art, if the bridge receives a frame with a destination address that is not in the already-full forwarding table, then the bridge often "broadcasts" each such frame, meaning it communicates the frame out of all of its ports (other than the port on which it received the frame), with the expectation that the destination will receive the frame and respond to the broadcasting bridge with a confirmation, thereby permitting the bridge to update its MAC address forwarding table so that thereafter it has an entry that associates the port that received the confirmation with that destination MAC address. However, note that this approach has limitations, which are particularly victimized by the wrongdoer who floods the bridge per the prior art. For example, the MAC table has limited space. As another example, the MAC address forwarding table associates a timeout window with each stored MAC address, so that if there is no activity for the respective address during the timeout period, then that address is removed from the MAC table. Given these limitations, a wrongdoer may send thousands of different MAC addresses to a same bridge in a relatively short time period. Due to its size limitations, the MAC address forwarding table of the bridge will reach its address limits and if broadcasting will add a large amount of traffic to the network. Moreover, once the MAC address forwarding table fills, the bridge having that table no longer accepts new MAC addresses, that is, it broadcasts all incoming traffic with unknown MAC addresses to the ports within the VLAN defined by the frame. As a result, quickly the bridge is overwhelmed and it fails to perform its bridging functionality while also starting to drop frames from other sources. Thus, the bridge and possibly the network as a whole are stifled by this attack.

Two approaches have been attempted in the prior art to deal with the above-discussed principles and bridge limitations. In a first approach, MAC addresses are statically changed in the bridge MAC address forwarding table. In this approach, the MAC address forwarding table is manually established, and when new frames with not-yet-included MAC destination addresses are received by the bridge, they are dropped and the table is therefore not later updated with what would be a response to a broadcast of that frame. However, since the dropped frames are not broadcast by the bridge, there is a reduced chance of burdening the network with these frames. In a second approach, a MAC-based authentication is employed each time a node joins the network or is powered on. In this approach, when a MAC address entity joins the network or is powered on, it issues what is sometimes referred to as a registration frame so that the frame may be received by a bridge and the bridge may update its MAC address accordingly.

The prior art approaches discussed above may reduce the chance for a bridge to be overburdened by flooding it with MAC frames, but there are also drawbacks to these approaches as may be ascertained by one skilled in the art. As a drawback example of the first approach, legitimate frames may be received by the bridge, but if they include a destination MAC address that is not already in the bridge table, those frames will be dropped and therefore denied service by the network. As a drawback example of the second approach, multiple instances of a registration are required in that a device may be periodically powered off and on, and it also permits a wrongdoer to flood the network and its bridges with numerous registration frames. Given the above, a need has arisen to address the drawbacks of the prior art as is achieved by the preferred embodiments as further detailed below.

BRIEF SUMMARY OF THE INVENTION

In the preferred embodiment, there is a method of operating a bridge node in a network system. The bridge node comprises a plurality of ports. The method comprises a step of receiving a frame, from a device in the network system and other than the bridge node, at a port in the plurality of ports. The frame comprises a source network address. The method is also responsive to at least one condition associated with the port, in that the method stores the source address in a forwarding table associated with the bridge if the at least one condition is satisfied. The at least one condition comprises whether the frame was received within a time window $T_w$ of when a threshold number of previous frames were received at the port and their respective source network addresses were stored in the table.

Other aspects are also described and claimed.

DETAILED DESCRIPTION OF THE INVENTION

Figure 1:
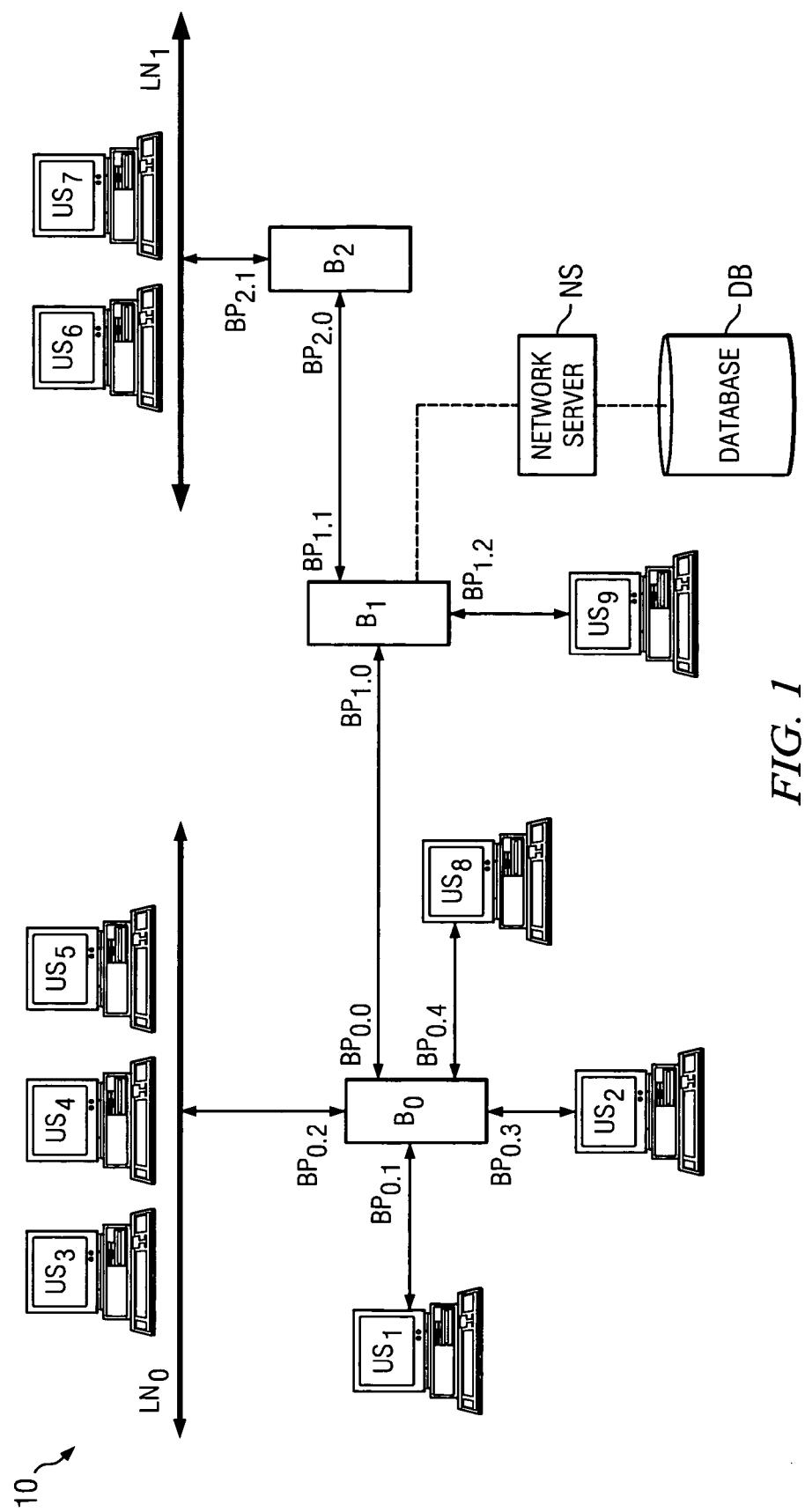
FIG. 1 illustrates a network system according to an example of the preferred embodiments.

FIG. 1 illustrates a block diagram of a network system 10 into which the preferred embodiments may be implemented. In general at the level illustrated in FIG. 1, each item in system 10 is known in the art, where the nodes shown therein may be constructed using various forms of hardware and software programming to perform steps consistent with the discussions in this document. However, as detailed later, the methodology of operation as well as certain functions added to the bridge nodes provide for the preferred embodiments and improve system 10 as a whole, and such methodology and functionality may be readily added into the existing hardware and software programming of a system such as system 10. Indeed, as a result, the preferred embodiments are flexible and scalable to different sized networks.

System 10 generally represents a bridged network, such as an Ethernet network, that includes a number of nodes. In the context of Ethernet, some of the nodes may be referred to as Ethernet bridges or switches, and for sake of consistency the term "bridge" will be used in this document Note that the physical connections between bridges and other devices in system 10 may be referred to in various manners and may be achieved in various ways, but in any event they permit bidirectional communication between each group of two connected bridges. Communication is by blocks of data, often referred to as frames, packets, or messages, and for sake of consistency the term "frame" will be used in this document. Within portions of the network and as also known in the art, an additional layer of routing may be imposed that thereby defines the path along which frames are communicated within the network. Looking then to system 10 in general, it includes three bridges $B_0$ through $B_2$. In system 10, each bridge $B_x$ is also coupled to one or more other bridges, via a respective port. For example, bridge $B_0$ is coupled to bridge $B_1$ via a port $BP_{0,0}$, and bridge $B_1$ is coupled to bridge $B_2$ via a port $BP_{1,1}$. Note that the coupling of bridges as shown may be by direct connection or there could be intermediate nodes that do not have the functionality of a bridge. In any event, from the illustration of FIG. 1, one skilled in the art will appreciate the remaining couplings between respective bridges in FIG. 1, which along with the above-discussed couplings are summarized in the following Table 1:

TABLE 1

| Bridge Node | Coupled bridge nodes |
|---|---|
| $B_0$ | $B_1$, via port $BP_{0,0}$ |
| $B_1$ | $B_0$, via port $BP_{1,0}$ |
|  | $B_2$, via port $BP_{1,1}$ |
| $B_2$ | $B_1$, via port $BP_{2,0}$ |

In addition to the bridge connections described above, bridge $B_1$ is coupled to a network server NS, which for reasons more clear below is sometimes referred to as an authentication server and is coupled to a database DB.

Continuing with system 10, for sake of example several of the bridges are also shown as connected to user station nodes $US_x$, which may be referred to by other names such as a customer nodes or customer stations. The user stations are examples of nodes that may be implemented in LANs, WANs, or the global Internet, either at the same or at remotely located networks, such as at different physical locations of a business entity, university, government institution or the like. Typically, it is desirable for certain user stations to communicate with others, and a key function therefore of the bridges is to facilitate such communication in a fashion that is not intrusive or even discernable to the user stations. As a result, one user station in system 10 may communicate with another user station in system 10 across great distances with transparency of the network layers and nodes between them. In addition, in FIG. 1, some of the user stations are shown as separately connected to respective ports of a bridge node while other user stations are connected to local area networks (LANs), where the LANs support a set of local user stations. As an example of the former, user station $US_1$ is connected to a port $BP_{0.1}$ of bridge $B_0$, while LAN $LN_0$ is connected to a port $BP_{0.2}$ of bridge $B_0$. And, with respect to LAN $LN_0$, it is consisted of user stations $US_3$, $US_4$, and $US_5$ and a shared transmission media, where the shared transmission media is sometimes implemented as an aggregation hub. The connectivity of these and the remaining examples of user stations in FIG. 1 is summarized in the following Table 2:

TABLE 2

| Bridge Node | Coupled user station or LAN |
|---|---|
| $B_0$ | $US_1$, via port $BP_{0.1}$ |
|  | $US_2$, via port $BP_{0.3}$ |
|  | $US_8$, via port $BP_{0.4}$ |
|  | LAN $LN_0$ (with $US_6$ and $US_7$), via port $BP_{0.2}$ |
| $B_1$ | $US_9$, via port $BP_{1.2}$ |
| $B_2$ | LAN $LN_1$, via port $BP_{2.1}$ |

Having now introduced system 10, note that under various operations system 10 may operate according to the prior art, while in addition thereto the preferred embodiments improve resistance to MAC overflow attacks at the bridge nodes $B_x$. By way of background to various of these aspects, each bridge maintains a memory storage area, often implemented in a content addressable memory ("CAM"), which is referred to herein as a MAC address forwarding table (or simplified, "forwarding table"). In the preferred embodiment, the data structure of the MAC address forwarding table for each bridge is now introduced. When a bridge according to the preferred embodiment receives a frame with a source MAC address, then if certain conditions are met (detailed later), then various address information from that frame is stored in the bridge's MAC address forwarding table. To simplify an understanding of this information, consider the instance where a bridge, such as bridge $B_0$ by way of example, is first enabled and its MAC address forwarding table is empty and thereafter a first entry is added to the table. In this case, the data of the forwarding table takes the form of the following Table 3:

TABLE 3

(MAC forwarding table)

| MAC Address | Port ID | Port Type | Time Stamp | Authenticated |
|---|---|---|---|---|
| A | 0.1 | User | T1 | NO |

The top row of Table 3 is not necessarily included in the actual data table, but it is included here so as to provide understandable descriptors to the data values included in the table. Looking to the columns of Table 3, in the first column the bridge preferably stores the source MAC address from the received frame. For simplification in this document, capital letters are used as exemplary MAC addresses when in implementation actual MAC addresses or other forms may be stored. In the second column, the bridge preferably stores an identifier of the port at which the received frame was received. In the example where Table 3 is the table for bridge $B_0$, then it is shown to have received a frame at its port $PB_{0.1}$; of course, the specific indication of "0.1" in this example is to match the identifiers in FIG. 1, whereas in real application ports may be identified in various ways. In any event, this port information provides a basis as detailed later to distinguish the receipt of a number of frames at one port of the bridge as compared to the other port(s) of the same bridge. In the third column, the bridge may store an identifier of the port type at which the received frame was received; this information provides a basis to determine later if authentication is required as to the respective MAC address as well as to adjust parameters that determine whether the information in a given received frame is stored in the MAC address forwarding table. In the fourth column, the bridge preferably stores a time stamp of when the presently-received frame was received. Finally, in the fifth column, and as discussed below in connection with FIGS. 2 and 3, the bridge preferably also undertakes an authentication methodology with respect to some or all of the entries in its forwarding table, so the fifth column indicates the status of the authentication at any given time, with YES meaning the corresponding MAC address has been determined to be authentic, NO meaning the corresponding MAC address has not yet been checked for authenticity, and N/A meaning authenticity will not be determined for the corresponding MAC address.

Figure 2:
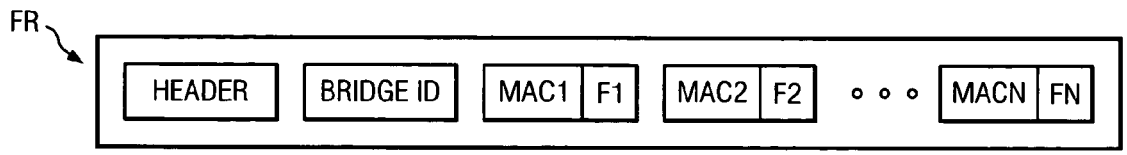
FIG. 2 illustrates a frame with various blocks of data therein for performing MAC address authentication (i.e., determining authenticity) per the preferred embodiments.
Figure 3:
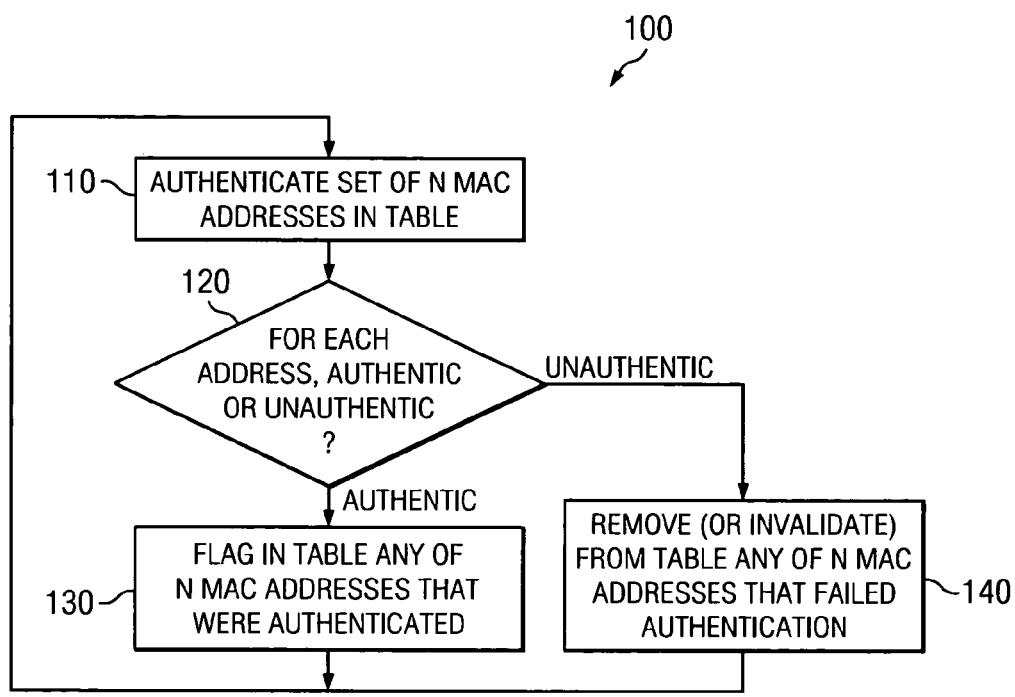
FIG. 3 illustrates a method of authentication by a bridge node per the preferred embodiments.

FIGS. 2 and 3 are directed to the preferred embodiment methodology of source MAC address authentication, which was introduced with respect to the fifth column in Table 3. Particularly, authentication is preferably performed with respect to any frame in the forwarding table that was received from a user station, but for reasons discussed later authenticity is not sought for a frame(s) received by one bridge from another bridge. In regard to authenticity of a frame received from a user station, FIG. 2 illustrates a preferred frame FR with various blocks of data therein and FIG. 3 illustrates a preferred method 100 of authentication. Each of these illustrations is further detailed below.

Looking first to frame FR of FIG. 2 and from let to right, it includes a header that may be comparable in certain respects to other network frames. However, the frame header preferably includes, among other things, an identifier that frame FR is directed to frame authentication, where the identifier might indicate an authentication request by a requesting bridge node or the response to that request, as discussed further below in connection with FIG. 3. Next in frame FR is a bridge identifier ("ID"), where the identification is either of the bridge that sent the frame FR request, or the bridge to receive a response from such a request. Lastly in frame FR there is a number N of MAC address identifiers, shown as MAC1 through MACN, where preferably N is greater than one so that a bridge node may request, in a single frame, authentication of more than one MAC address at a time. Lastly, note that a flag may be added to each of the N MAC address identifiers when frame FR is returned to the requesting bridge, where by way of example each MAC address identifier in frame FR is shown to have a flag Fx appended to it (e.g., flag F1 for MAC1, F2, for MAC2, and so forth). The flag indicates whether during authentication the respective MAC address was found to be authentic (i.e., flag set to a first state) or unauthentic (i.e., flag set to a second and different state). These flags may be provided in some other form, such as by including them elsewhere in frame FR (e.g., in the header).

As introduced above, FIG. 3 illustrates a method 100 of authentication, where note now that preferably method 100 is performed by multiple bridges in system 10, although in some instances there may be some bridges that do not perform this method. Method 100 may be implemented, by way of example, as a computer program in a bridge that includes sufficient hardware, software, and data information so as to perform the steps detailed below. By way of example, therefore, consider a bridge that is connected to one or more user stations but is not connected directly to a network server, such as bridge $B_0$ in FIG. 1 which is not connected to network server NS but is connected to user stations $US_1$, $US_2$, and $US_8$. Method 100 begins with a step 110, wherein the bridge (e.g., $B_0$) determines the authenticity of a set of N MAC addresses in the bridge's own MAC forwarding table. In the preferred embodiment, step 110 is performed by the bridge collecting the N MAC addresses from its forwarding table based on timing considerations detailed later, and those N MAC addresses are communicated to the network in a frame FR in the form shown in FIG. 2. The header of frame FR indicates the nature of the frame and it is connected either directly, or through intermediate bridges, to a network server that provides address authentication. Thus, in the present example, bridge $B_0$ issues a frame FR to be received by bridge $B_1$, which is connected directly to network server NS. In response, bridge $B_1$ services the authentication request. Using the terminology from other authentication processes known in the art, therefore, then the requesting bridge node (e.g., $B_0$) is a supplicant and the bridge (e.g., $B_1$) that receives its request and is able to service it via a network server is known as an authenticator. The supplicant, in effect, requests to the authenticator an authentication which, if granted, permits the supplicant to take further action in trusting the information that is authenticated. In response to the supplicant's request, the authenticator communicates with network server NS. Thus, in the example of FIG. 1, bridge $B_1$ becomes an authenticator for the supplicant bridge $B_0$ and in connection with frame FR and, hence, bridge $B_1$ communicates with network server NS and database DS. In the preferred embodiments, database DS is previously configured, such as by a network manager or the like, so as to store a list of authentic or valid MAC addresses for system 10. As a result, a bridge connected directly to network server NS is able to access, via network server NS, this list or to have network server NS do so. Thus, in the present context, each of MAC addresses MAC1 through MACN is evaluated to determine if it is authentic, such as by determining whether each of those addresses has been previously stored to database DS. In response, network server NS returns to the immediately-connected authenticator bridge (e.g., $B_1$) an indication for each of the N MAC addresses, where as stated above the indication may be in the form of a flag appended to or otherwise corresponding to each MAC address in frame FR. The authenticator then forwards this information back to the supplicant (i.e., initially-requesting) bridge. Returning then to method 100 of FIG. 3, when the supplicant bridge receives the response from its authentication request, step 110 is complete and method 100 continues to step 120.

In step 120, the supplicant bridge (e.g., $B_1$) responds to each of the authenticity indications in the response it received from the step 110 authenticity determination. Thus, for each MAC address indicated by the authenticator as authentic, method 100 continues from step 120 to step 130. Conversely, for each MAC address indicated by the authenticator as unauthentic, method 100 continues from step 120 to step 140.

In step 130, having been reached due to a finding of an authentic MAC address, the supplicant bridge (e.g., $B_1$) updates its forwarding table to indicate that the corresponding MAC address (or addresses) therein is authentic. Returning briefly then to Table 3, note that as of the time shown in Table 3 and per its fifth column, the MAC A address has not checked for authenticity, that is, either step 110 or a response thereto has not been completed as of that time. However, if per step 120 MAC address A has been found to be authentic (i.e., valid per database DS) and the flow is directed to step 130, then in step 130 the fifth column is updated accordingly, which would be as shown in the form of Table 3, but by changing the "NO" to a "YES" indication. Of course, other manners of indicating an authentic address may be used, such as setting a single binary value to one state, where it is understood that such a state indicates an authentic address while its complement indicates an unauthentic address. Following the table update of step 130, method 100 returns to step 100 to check the authenticity of another set of N MAC addresses.

In step 140, having been reached due to a finding of an unauthentic MAC address (which may be learned from a directly-connected station or from some station(s) coupled to or hiding behind an aggregation hub), a corresponding action is taken with respect to the entry for that MAC address (or addresses) in the forwarding table. Returning briefly then to Table 3, recall again that as of the time shown for Table 3 the MAC A address has not checked for authenticity. However, upon reaching step 140, where the address at issue is unauthentic (e.g., not authentic or not stored in database DS), then a step is taken to invalidate that entry in Table 3 so that the storage space for that entry is freed up for use for a different address in the future. By way of example, for such an address found to be unauthentic, the entry for it in the supplicant's MAC forwarding table may be marked as invalid and later overwritten, or at the time of determining the unauthentic nature the entry in the forwarding table may be removed from that table. In any event, therefore, note that unauthentic entries are over time identified and purged from a forwarding table, thereby making the valuable memory space of that table available for later entries as additional frames with corresponding MAC addresses are received by the supplicant bridge. Following the table update of step 140, method 100 returns to step 100 to check the authenticity of another set of N MAC addresses.

From the preceding, various observations may be made with respect to method 100. In general, the method permits a bridge to request authentication of up to N MAC addresses at a time, and upon determining the authenticity of those address, the bridge updates it MAC address forwarding table accordingly and overhead may be reduced by determining authenticity of multiple addresses with a single frame FR. For addresses that are updated as authentic, thereafter the bridge may operate with respect to those addresses as known in the art, such as routing future frames to the authenticated addresses. For addresses that are found to be unauthentic, the bridge may use the memory space previously used by that address information to accommodate newer-received addresses. In this manner and as further borne out below, memory space may be routinely freed up to accommodate additional addresses. Additionally, if a wrongdoer seeks to flood a MAC forwarding table with unauthentic addresses, then method 100 over time purges those addresses, thereby reducing the chance of overwhelming the bridge node due to the receipt of the unauthentic addresses. Lastly, note that the timing of occurrences for how often the authentication occurs and the responses thereto are taken may be adjusted by one skilled in the art, further in view of additional considerations set forth below.

Figure 4:
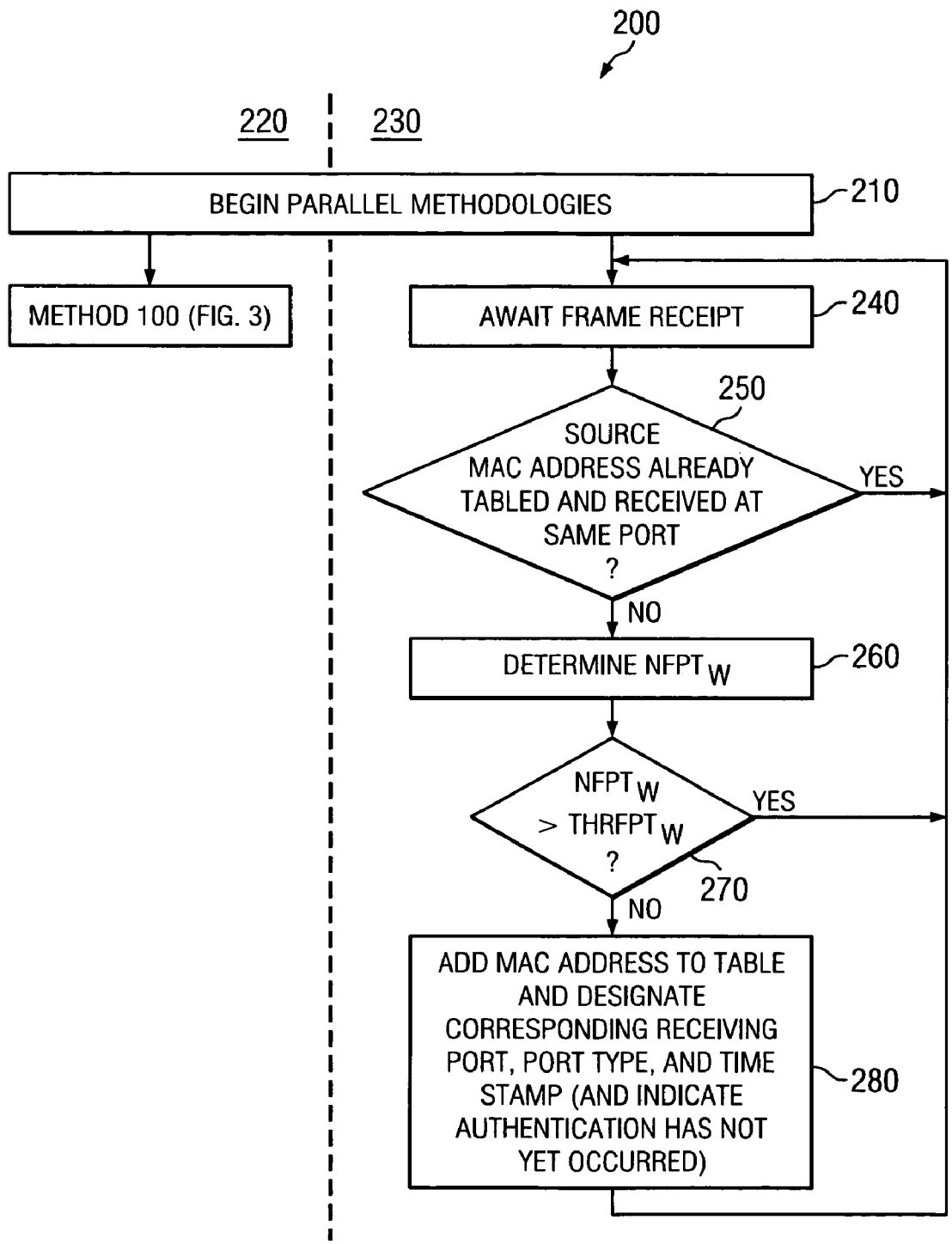
FIG. 4 illustrates a method of operation of a bridge node for updating a MAC address forwarding table according to the preferred embodiments.

FIG. 4 illustrates a method 200 of operation of a bridge node according to the preferred embodiment, where preferably method 200 is performed by multiple bridge nodes in system 10, although in some instances there may be some bridge nodes that do not perform this method. Method 200 may be implemented, by way of example, as a computer program in a bridge that includes sufficient hardware, software, and data information so as to perform the steps detailed below. Method 200 commences with a start step 210, which indicates that the bridge begins parallel methodologies, shown generally at 220 and 230. Specifically, one of these methods, as shown by 220 to the left of FIG. 4, is method 100 of FIG. 3. Thus, method 220 of FIG. 4 is intended to demonstrate that preferably method 100 is continuously performed by the bridge at issue, while at the same time a separate method 230 is also performed, as shown generally to the right of the method 220. In other words, while method 230 is performed, so is method 220 which performs the method 100 of FIG. 3; thus, the bridge's forwarding table is over time monitored in that up to N MAC addresses at a time are checked for authenticity, with the addresses identified as authentic being so marked and the addresses identified as unauthentic being invalidated, removed, and/or overwritten by newer-received addresses. Method 230, which operates in general during the same time, is detailed below.

Method 230 (a parallel method in method 200) begins with a wait state shown in step 240. Specifically, step 240 continues until a frame is received by the bridge at issue. For the discussion of method 230 and unless otherwise stated, the intended frame at issue is of the type that is common in Ethernet, wherein a source and destination address are included as are some type of additional data, where in the prior art when such a frame is received its source address and the port at which is was received are often added to the receiving bridge's MAC address forwarding table and thereafter those values are used for routing traffic back to that address when it is shown as a destination address. However, in contrast, the preferred embodiments implement certain conditions that operate in this context so as to reduce the chance that the bridge fills its MAC address forwarding table with unknown (or illegitimate) MAC addresses. For sake of continuing the same example discussed above, assume then that method 200 and its parallel methodologies are being performed by bridge $B_1$. Thus, it awaits a frame from any of LAN $LN_0$ or user stations $US_1$, $US_2$, or $US_8$, as well as any other node that is later connected to a port of bridge $B_1$. Once a frame is received, method 230 continues from step 240 to step 250.

In step 250, a condition is imposed and that first determines whether there is the possibility to store the MAC address of the presently-received frame in the bridge's MAC address forwarding table, but note that this condition is based on the port that received the frame. Specifically, in step 250, the bridge having received a present frame determines whether the source MAC address in that frame already has been received in another frame at the same port and tabled (in the forwarding table). In other words, step 250 determines whether the source MAC address in the presently-received frame is unique as compared to the other source MAC addresses already in the forwarding table for the same port at which the presently-received frame was received. If such a duplicate-source address frame was received at the same port and tabled, then method 230 returns the flow from step 250 to step 240 to await receipt of a next frame. Also, while not discussed herein so as to focus on aspects of the preferred embodiments, if the received frame has a valid and authenticated source and destination address, then the frame may be forwarded to its destination as per the prior art. Per step 250, however, if there is no learned-source address frame received at the same port and tabled, then method 230 continues from step 250 to step 260.

In step 260, a concept is introduced that is a time window, indicated in this document as $T_w$, which becomes another condition that may be imposed to determine whether there is the possibility to store the MAC address of the presently-received frame in the bridge's MAC address forwarding table, and note that this condition is also based on the port that received the frame. The duration of time window $T_w$ may be established by one skilled in the art and, as appreciated later, may be changed for different bridge nodes, different ports at a single bridge node, and even for different times of day for a given bridge or given port. In any event, in step 260, with the bridge having received a present frame with a source address that was not earlier stored in its MAC address forwarding table from the same port, the bridge determines, for the port that received the presently-received frame, the number of frames stored in the MAC address forwarding table and received from that same port within $T_w$, where this number is abbreviated in this document as $NFPT_w$ ("N" for number, "F" for frames, "P" for same port, and "$T_w$" for during the past time window, $T_w$). Further in this regard and again returning to Table 3, recall that another entry therein is the port along which each corresponding frame is received, as shown in the single example as port ID equal to 0.1. Thus, assuming Table 3 had numerous entries, then step 260 determines, looking to time stamps that shown time within a duration in the past $T_w$ as compared to the time of arrival of the presently-received frame, how many other unique-source address frames were received at that same port and tabled, with the result being the value of $NFPT_w$. Next, method 230 continues from step 260 to step 270.

In step 270, the bridge compares $NFPT_w$ to a threshold, designated $THRFPT_w$. This comparison effectively provides a metric of whether an unacceptably and possibly suspiciously large number of frames have been received at the same port during $T_w$, and with unique (from one another) addresses due to the previous finding of step 250. In other words, threshold $THRFPT_w$ is set to a certain number, at which point such a suspicion may arise. As a result, in step 270, if the number of frames from a same port and within time $T_w$ and having unique addresses with respect to one another (as detected in step 250) as reflected by $NFPT_w$ exceeds threshold $THRFPT_w$, then it is quite possible that the bridge port at issue is being maliciously flooded with frames having unauthentic addresses. Thus, should $NFPT_w$ exceed threshold $THRFPT_w$, then method 230 returns from step 270 to step 240, to await a next frame. Note, therefore, that if this suspicious event occurs, then the frame, received at the immediately preceding step 240 and then processed by steps 250, 260, and 270, does not cause a new write to the bridge's MAC address forwarding table and the frame's address also is not broadcast to the network. Thus, the bridge is not dramatically affected by this frame. Moreover, if additional frames of the same suspicious attributes are received within $T_w$, they will be treated in the same manner and the effect of each on the receiving bridge will be minimized with a corresponding reduced chance that such frames will overwhelm that bridge.

In step 280, having been reached only if $NFPT_w$ has not exceeded $THRFPT_w$, then the bridge node writes various data with respect to the presently-received frame to its MAC address forwarding table, where that data is consistent with the descriptors shown in Table 3. Thus, from that frame, the MAC address is written, as are the port ID, the port type, and a time stamp of when that presently-received frame was received. Lastly, the authenticated indicator for the MAC address is set to a value indicating that authentication has not yet occurred, while the parallel method 100 may at some point thereafter seek to authenticate the entry and thus change that value (or remove the entire entry if the MAC address is determined to be unauthentic). Thereafter, method 230 returns the flow to step 240 to await the next received frame, upon which method 230 proceeds with respect to that frame and per the preceding description.

Given the preceding, various aspects of the preferred embodiment may be appreciated further by considering an example wherein system 10 has operated for a period of time and bridge $B_0$ has further developed its MAC address forwarding table. In such an example, assume therefore that Table 3 is further developed to include additional entries, as shown immediately below in Table 4, and assume that during the additional time spent in receiving frames and adding to Table 3, the first entry for MAC address A at T1 has been determined to be authentic, as shown by the fifth column in Table 4 which indicates YES as compared to that same entry in Table 3:

TABLE 4

| MAC Address | Port ID | Port Type | Time Stamp | Authenticated |
| --- | --- | --- | --- | --- |
| A | 0.1 | User | T1 | YES |
| B | 0.3 | User | T2 | YES |
| C | 0.4 | User | T3 | NO |
| D | 0.4 | User | T4 | YES |
| E | 0.4 | User | T5 | YES |
| F | 0.2 | User | T6 | NO |
| G | 0.0 | Network | T7 | N/A |

With Table 4, a few examples are instructive in tracing through the steps of method 200, and such examples are examined below while numerous other examples may be appreciated by one skilled in the art.

Consider a first example with respect to Table 4 where bridge $B_0$ receives at its port $BP_{0.1}$ a frame with a source MAC address A and that arrives at a time T8 that follows T7. Per step 250, therefore, note that the source MAC address A has been already received and learned successfully at the same port (i.e., $BP_{0.1}$) and tabled, since the first row of Table 4 shows such a frame. As a result, the presently-received frame MAC source address is not unique with respect to a tabled entry for the same port and, hence, no additional entry is made by bridge $B_0$ in its MAC address forwarding table and the method flow instead returns to step 240.

Consider a second example with respect to Table 4 where bridge $B_0$ receives at its port $BP_{0.3}$ a user station frame with a source MAC address A and that arrives at a time T9 that follows T7, assuming also that $T_w$ is more than the time between T1 and T9. Per step 250, while the same MAC address was received at time T1, note however that the earlier receipt was at a different port than the presently-received frame. Thus, the flow continues to steps 260 and 270. Accordingly, provided that the number of frames received at port $BP_{0.3}$ during that past $T_w$ is less than or equal to the threshold for that port (i.e., $THRFPT_w$), then this newest frame would be added to Table 4, resulting in the following Table 5. Note that this unauthenticated MAC address will not be used for purposes of forwarding frames until it is authenticated. If such authentication is successful, than this new entry of row 8 in Table 5 will be updated so that its indication of Authenticated will be changed from NO to YES.

TABLE 5

| MAC Address | Port ID | Port Type | Time Stamp | Authenticated |
| --- | --- | --- | --- | --- |
| A | 0.1 | User | T1 | YES |
| B | 0.3 | User | T2 | YES |
| C | 0.4 | User | T3 | NO |
| D | 0.4 | User | T4 | YES |
| E | 0.4 | User | T5 | YES |
| F | 0.2 | User | T6 | NO |
| G | 0.0 | Network | T7 | N/A |
| A | 0.3 | User | T8 | NO |

Consider a third example with respect to Table 4 where bridge $B_0$ receives at its port $BP_{0.4}$ a frame with a source MAC address H and that arrives at a time T10 that follows T7 and assume also that $T_w$ is more than the time between T1 and T10. Per step 250, the MAC address is unique as compared to the MAC addresses already in the forwarding table and, thus, the flow continues to steps 260 and 270. However, assume in this case that $THRFPT_w$ equals two, although such a number may be unrealistically low in a real application. In step 260, $NFPT_w$ is determined, that is, the number of frames stored in the MAC address forwarding table of bridge $B_0$ and received from that same port $BP_{0.4}$ as was the presently-received frame—this determination, from a review of Table 4, is equal to three (i.e., from the three MAC addresses C, D, and E from times T3, T4, and T5, all received at port $BP_{0.4}$). As a result, in step 270, its determination is answered in the positive, because the value of $NFPT_w$ exceeds the value of $THRFPT_w$. Accordingly, this newly-received frame is in effect considered a threat to overburden the bridge node for having received it at the same port that received other frames with unique MAC addresses during the past $T_w$. Thus, the MAC address information from this frame is not stored in the bridge's MAC address forwarding table and the flow returns to step 240 to await the next frame.

Having described the parallel methodologies in method 200 of FIG. 4 and given the preceding examples, various observations may now be made with respect to the preferred embodiments and contrast may also be made to the prior art. Accordingly, examples of such observations are separately discussed below.

As a first observation, consider a case where a bridge node performing method 200 receives a very large number of frames each of which has an unauthentic source MAC address, sent quite likely in an effort to overwhelm and perhaps shut down the bridge. As explained above, a prior art bridge will accept these frames until its memory is completely filled and also thereafter begin broadcasting, thereby greatly overburdening the bridge and disrupting traffic on the network. In contrast, in the preferred embodiments, the impact of such frames on a bridge node are limited on both a per port basis and for a window of time. Thus, in effect, step 270 will prohibit tabling and broadcasting of a very large number of unique-addressed frames per a single port if they are received within time window $T_w$. Thus, the overall memory of the bridge node is not overwhelmed and indeed a certain portion of its table memory may be reserved for MAC addresses received at other ports, all by adjusting the values of $T_w$ and $THRFPT_w$.

As another observation with respect to the preferred embodiments, method 230 shows a single threshold $THRFPT_w$ beyond which frames are not recorded. However, note that multiple thresholds may be used whereby a less severe response is taken for each threshold. For example, a lower first threshold $THRFPT1_w$ may be set so that once $NFPT_w$ exceeds that threshold, the bridge node can reduce the rate at which it accepts frames at the corresponding port to also reduce the chance of overwhelming the bridge, and then if a larger second threshold THRFPT2$_w$ is exceeded by NFPT$_w$, then the frames may be dropped altogether. Also, for one or both thresholds, as they are reached by NFPT$_w$, then in another preferred embodiment a warning or indication is sent to a network administrator, thereby permitting additional investigation into the cause of the large rise in unique MAC addresses received at a single bridge port. In any event, therefore, in the preferred embodiment a first treatment of forwarding table storage is made for a first set of unique addresses that arrive at a same port within a set time, but as the number of frames with those unique addresses increases, then a second and different treatment is provided for later-received ones of such frames. As shown by examples, this changed treatment may be to drop the later frames, to slow the rate of acceptance of them, and/or to issue an alarm or indication to a network manager or the like of this status. Still other treatments may be ascertained by one skilled in the art.

As still another observation with respect to the preferred embodiments, note the benefits of both T$_w$ and the parallel operation of method 100. Particularly, as T$_w$ is passing in time, method 100 may well identify various authentic MAC addresses in the MAC address forwarding table, but at the same time it also may identify unauthentic addresses in that table, thereby removing the latter from the memory (or at least permitting them to be overwritten). Thus, at the same time that T$_w$ is passing memory may be freed up to accommodate newly-received unique-addressed frames, where this result occurs because as addresses are marked as unauthentic, the later value of NFPT$_w$ for the port that received those addresses is reduced. Thus, step 270, with the reduced NFPT$_w$, will be more often answered in the negative, thereby storing other MAC addresses also received at that same port in the table. Further, T$_w$ may be set to a desired value based on the notion that during its passage some memory should be filled with unauthentic addresses while other unauthentic addresses are removed from that same memory space. Still further, note that if T$_w$ elapses during times when there is not a flooding of frames to a bridge port, then there is ample time for authentication to occur with respect to those already-stored MAC addresses, so it is likely that only legitimate MAC addresses will then remain in the MAC address forwarding table, thereby leaving the rest of the memory space open for later-received MAC addresses.

As a final observation, in the preferred embodiment note that the MAC address forwarding table includes a port type indication, where by way of example in Table 4 note that MAC address G is shown to be of a network type because it arrived at port BP$_{0.0}$, which is connected to another bridge node, namely, bridge B$_1$. In this instance, the frame was received via further connections of a network rather than directly from a user station, and it may be presumed that the other bridge node from which the frame is received also has performed the preferred embodiment methodology, thereby reducing the possibility that the frame has an unauthentic MAC address. Thus, for such MAC addresses, that is those received by one bridge from another bridge, may be considered as authentic and excluded in the analysis of method 200.

Figure 5:
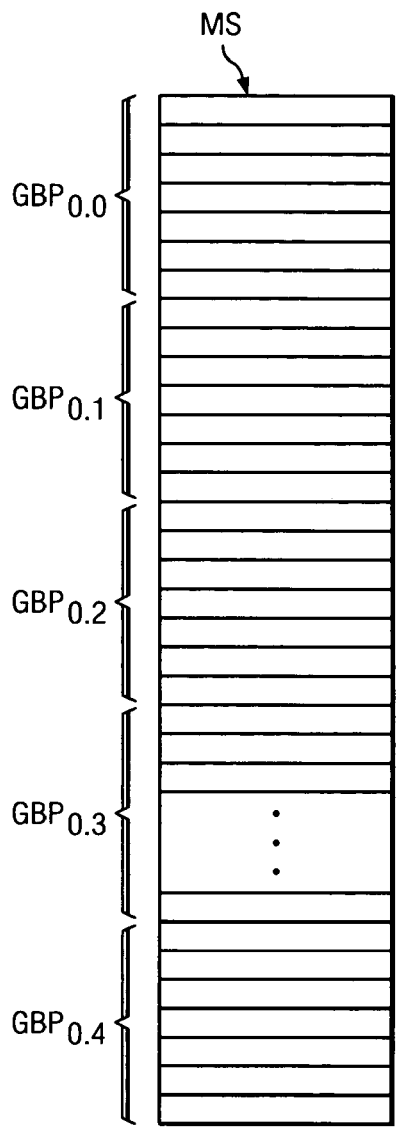
FIG. 5 illustrates a logical depiction of the memory space used as a forwarding table by a bridge per the preferred embodiments.

FIG. 5 illustrates a block diagram of a memory space MS intended as a logical depiction of the memory in which a bridge per the preferred embodiment stores its MAC address forwarding table, and also illustrated is the effective logical partitioning that results due to the preferred embodiment methodology described above. By way of example, memory space MS is drawn and designated to correspond to bridge B$_0$ of FIG. 1. In the preferred embodiment, memory space MS is in effect divided to have portions to store MAC source addresses from frames received at each port of the bridge that maintains the memory; accordingly, in the example of bridge B$_0$, which has five ports BP$_{0.0}$ through BP$_{0.4}$, then memory space MS is in effect divided into five memory groups, designated GBP$_{0.0}$ through GBP$_{0.4}$, corresponding to MAC addresses received at bridge ports BP$_{0.0}$ through BP$_{0.4}$, respectively. For sake of example, each group GBP$_{x.y}$ is shown to be of the same or approximately the same size, meaning having the same or approximately the same amount of memory space; in actual implementation one or more groups may differ in size based on various considerations, such as the port type, which recall is stored by the bridge according to the preferred embodiment and as shown by way of example in Table 3, above. Moreover, each individual memory space for a given group GBP$_{x.y}$ need not be consecutive as shown and, thus, FIG. 5 is merely intended as a logical depiction of one approach.

The FIG. 5 illustration of memory space MS assists with an appreciation of additional aspects of the preferred embodiments, both in connection with the preceding as well as with respect to an additional aspect discussed below in connection with FIG. 6. Recall that a bridge according to the preferred embodiment receives a frame and stores its respective source MAC address only if one or more conditions are met and those conditions relate to the port at which the frame (and its source MAC address) is received. Looking then to FIG. 5, it logically depicts that in effect each bridge port will be expected to have a limited about of memory available to it in memory space MS, where the setting of value of THRFPT$_w$ per port will prevent the bridge from storing addresses from one port that consume an undesirably large allocation of memory space MS as compared to the number of addresses the bridge receives and stores based on its other ports. In other words, since each port has its own condition(s) associated with it and with THRFPT$_w$ set appropriately, then as the preferred methodology is performed, the MAC addresses stored in memory space MS based on frames received at one port will be stored irrespective of frames received at other ports of the same bridge. In contrast, in the prior art, a MAC address in a frame received at one port may prevent the storage of a MAC address in a frame received at another port in the same bridge. Specifically, in the prior art, if one port is flooded with frames, the entirety of the forwarding table memory is filled, thereby preventing addresses received at other ports of the same bridge to be stored, so in effect the storage of MAC addresses received at one port is affected by the receipt of frames at other ports. However, in the preferred embodiment, by associating conditions with each port, then in effect the bridge will not permit the storage of MAC addresses from one port to overwhelm the entirety of memory space MS. Further, for each GBP, the memory is further logically divided to accommodate the MAC address learned during authentication process, that is, the MAC addresses that are not successfully authenticated and those MAC address that are authenticated. The unauthenticated MAC address may come from the same physical port as authenticated ones. However, the authenticated frames are going through the logical uncontrolled port. Thus, the unauthenticated MAC addresses are learned from an uncontrolled part of the port and not used in the forwarding process. In addition, the unauthenticated part of the GBP should not affect the forwarding decisions of the bridge.

Figure 6:
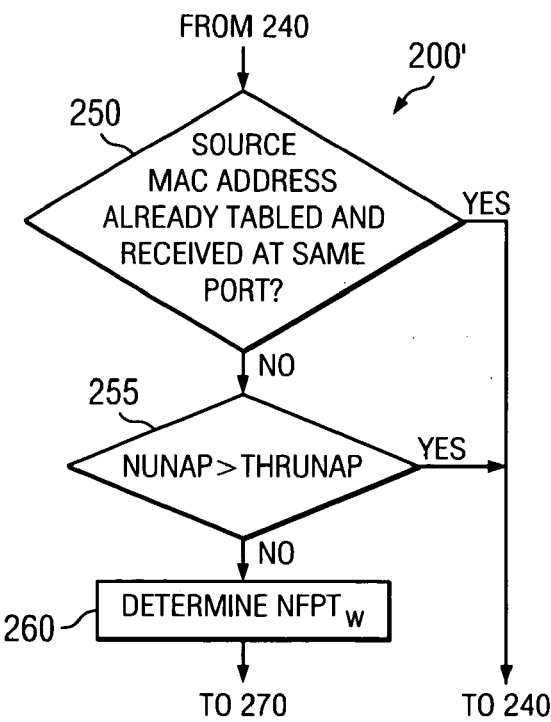
FIG. 6 illustrates an alternative preferred embodiment for the method of FIG. 4.

FIG. 6 illustrates an alternative embodiment method 200', which is intended to depict the use of the same steps as method 200 of FIG. 4, although only some steps are show to simplify the Figure with the additional steps understood to be included from method 200 described earlier. Additionally, FIG. 6 includes a new step 255 between steps 250 and step 260. Thus, step 255 is reached when step 250 is determined in the negative, and prior to reaching step 260. In step 255, a bridge (e.g., $B_0$) compares another value to another threshold, where the value is the number of unauthenticated addresses stored in memory space MS for the corresponding port, and that number is designated herein as NUNAP ("N" for number, "UN" for unauthenticated, "A" for address(es), "P" for port). Moreover, the compared threshold is designated THRUNAP. If NUNAP exceeds threshold THRUNAP, then method 200' does not continue to step 260, but instead returns to step 240 to await another frame; thus, in this instance, there is no chance for ultimate advancement to step 280 wherein the source MAC address for the received frame would have been stored in the forwarding table. In contrast, if NUNAP does not exceed threshold THRUNAP, then method 200' continues to step 260, where the flow continues as described above with respect to method 200, and the reader is referred to that earlier discussion for additional details.

Looking then at the effect of the addition of step 255 in method 200' of FIG. 6, it may be appreciated also in combination with memory space MS of FIG. 5 and also with reference to the example network system 10 of FIG. 1. Considering again bridge $B_0$, recall once more that the preferred embodiment in effect imposes conditions based on a per port basis, where those condition affect whether a source MAC address received in a frame at a given port is stored in the forwarding table. In this manner, the preferred embodiments effectively limit an attempted attack on a bridge to a single port of that bridge, leaving additional resources of the bridge (e.g., of memory space MS) for use by other ports. However, it is also recognized that situations may appear where multiple users may connect to a single port, such as by way of example at bridge port $BP_{0.2}$ which is connected to more than one user (i.e., user stations $US_3$, $US_4$, and $US_5$) via LAN $LN_0$. Given this possibility, as may occur with a LAN or other multiple-use connectivity (e.g., hub), note that only one of the multiple users connected to a port might be a wrongdoer, seeking to flood that port with numerous frames having respective different source MAC addresses. In effect, therefore, that one wrongdoing user station could use the entirety of the FIG. 5 memory group GBP for that port. For example, user station $US_3$ could flood port $BP_{0.2}$, thereby consuming a large portion of group $GBP_{0.2}$. In taking this action, there is little or no room left for what would likely be authentic source MAC addresses from user stations $US_4$ and $US_5$. Accordingly, looking again to step 255 of method 200', note now that in effect it reserves some space in memory space MS for already-authenticated MAC addresses. In other words, it prevents a source address from being written to the forwarding table memory space MS if there already are an undesirably large number of presently-unauthenticated MAC addresses stored there. Thus, once threshold THRUNAP is reached, no additional source addresses are written, so that threshold may be established by one skilled in the art to leave sufficient room in the physical memory for storage that can store already authenticated addresses. In addition, note further if there is a wrongdoer station that attacks a port based on a multiple-station connection to that port (e.g., via a shared transmission media), then any negative effect of that attack is limited only to the resources allocated to that connected port rather than to the bridge as a whole; thus, the chances are much higher as compared to the prior art for preventing the bridge as a whole from being disrupted due to the attack at a single port.

The preceding addition of step 255 may be further appreciated by considering two instances of further expansion on the previous example wherein user station $US_3$ is seeking to flood port $BP_{0.2}$, while user stations $US_4$ and $US_5$ seek to provide authentic addresses thereto. In a first instance, suppose that user station floods port $BP_{0.2}$ with unauthentic addresses at a time prior to the time when user stations $US_4$ and $US_5$ transmit to that same port their authentic addresses. In this case, there is the chance that a frame with an authentic address from user station $US_4$ or $US_5$ will be dropped by bridge $B_0$, if NUNAP exceeds THRUNAP at the time that frame is received. However, recalling the parallel methodologies of method 200 (or 200'), then as step 255 is reached for the authentic-addressed frame, there is the chance that the parallel authentication method 100 has reduced NUNAP at that time. If this is the case, then method 200' will advance beyond step 255 with respect to the authentic-addressed frame and thereafter the source MAC address for that frame will be stored in the forwarding table memory space MS. Thereafter, when that address is itself authenticated, it cannot be overwritten by additional flooding attempts by user station $US_3$. In a second instance, if a frame with an authentic address from user station $US_4$ or $US_5$ is communicated to bridge $B_0$ prior to a flooding attempt from user station $US_3$, then step 255 will pass the flow onward to step 260 because as of the time of receipt of such a frame the number of unauthenticated address for that port (NUNAP) will be zero of below threshold THRUNAP. Thus, in either the first or second instance, additional protection is provided to authentic source MAC addresses so as to increase the probability that they may be written to the forwarding table (and thereafter later-received frames may be forwarded based on those authentic addresses).

From the above illustrations and descriptions, one skilled in the art should appreciate that the preferred embodiments provide a network with MAC table overflow protection. These preferred embodiments include numerous advantages over the prior art, some of which have been detailed above and others of which are ascertainable by one skilled in the art. As still another benefit, while the present embodiments have been described in detail, various substitutions, modifications or alterations could be made to the descriptions set forth above without departing from the inventive scope. For example, the manner of determining authenticity of frames discussed with respect to step 110 of method 100 of FIG. 3 may be altered so that it is distributed to each bridge node locally rather than having a central network server NS and database DB. In this alteration, the bridge will compare a received user station MAC addresses with a cached authenticated/genuine MAC table retained at the bridge. As another example, $T_w$ and $THRFPT_w$ may be flexibly set according to a specific port profile—an example of such a setting is in the possibility of expecting the number of unique MAC addresses for the ports in an employee's office to be high at the start of the working day and to diminish thereafter, due for example to the likelihood of many computers starting up at the beginning of the workday and thereby presenting new (for that day) MAC addresses to bridge nodes. Thus, to accommodate this expectation, $THRFPT_w$ may be set to a higher value during the morning. Depending on the port characteristics, the $T_w$ and $THRFPT_w$ may be dynamically arranged so that the possibility of re-validating the client MAC addresses can be limited within the acceptable range. Indeed, note that either or both of $T_w$ and $THRFPT_w$ may in alternative embodiments be different for different ports at the same or different bridges, thereby adding flexibility to the number of uniquely-addressed frames that are likely to be tabled for that port over time. As another example, the preferred embodiments may apply to networks other than Ethernet networks. As still another example, while the preceding discussions have detailed various methodologies provided by bridge nodes, it should be understood that such methodologies may be combined with other methodologies provided now or in the future by such bridge nodes. Thus, these examples further demonstrate the inventive scope and its benefits, which all greatly reduce the possibility of MAC address table overflow. As a result, these advantages as well as the preceding descriptions further serve to exemplify the inventive scope, as is defined by the following claims.

The invention claimed is:

1. A method of operating a bridge node in a network system, the method comprising:
   receiving a frame, from a device in the network system, the frame comprising a source network address;
   responsive to at least one condition, storing the source address in a forwarding table associated with the bridge if the at least one condition is satisfied;
   the bridge node comprises a plurality of ports;
   the device in the network system is other than the bridge node;
   the frame is received at a port in the plurality of ports;
   the at least one condition is associated with the port; and
   the at least one condition is satisfied if the frame was received within a time window $T_w$ and the number of frames that were received at the port within the time window $T_w$ and whose respective source network addresses were stored in the forwarding table does not exceed a threshold number.

2. The method of claim 1 wherein the at least one condition further comprises whether the source address is different from each and any source address, previously-received in a respective frame at the port, already stored in the forwarding table.

3. The method of claim 2 and further comprising adjusting the threshold number at different times.

4. The method of claim 1:
   wherein each port in the plurality of ports has an associated threshold number; and
   wherein the threshold number associated with one port in the plurality of ports differs from the threshold number associated with another port in the plurality of ports.

5. The method of claim 1 and further comprising adjusting the time window $T_w$ at different times.

6. The method of claim 1:
   wherein each port in the plurality of ports has an associated time window $T_w$; and
   wherein the time window $T_w$ associated with one port in the plurality of ports differs in duration from the time window $T_w$ associated with another port in the plurality of ports.

7. The method of claim 1 and further comprising the bridge determining whether a plurality of source addresses in the forwarding table are authentic.

8. The method of claim 7 and further comprising the bridge issuing a request to the network system for determining whether a plurality of source addresses in the forwarding table are authentic.

9. The method of claim 8 and further comprising receiving at the bridge a response to the request, the response provided by an additional bridge.

10. The method of claim 7 and further comprising, in response to the determining step, the steps of:
    providing an authentic indication in the table for each source address in the table determined to be authentic; and
    permitting an overwriting of each source address in the table determined to be unauthentic.

11. The method of claim 10 wherein the at least one condition further comprises whether a number of source addresses having an inauthentic indication in the table exceed a threshold.

12. The method of claim 7 and further comprising, responsive to the at least one condition associated with the port, storing a set of parameters associated with the frame, the set of parameters consisting of an identifier of the port and an identifier of a time of receipt of the frame.

13. The method of claim 12 wherein the parameters further comprise an indication of a type of the port and an indicator of whether the source address has been determined for authenticity.

14. The method of claim 1 wherein the network system comprises an Ethernet network system.

15. A method of operating a bridge node in a network system, the bridge node comprising a plurality of ports, the method comprising:
    receiving a frame, from a device in the network system and other than the bridge node, at a port in the plurality of ports, the frame comprising a source network address; and
    conditioned on whether the source address is different from each and any source address, previously-received in a respective frame at the port, already stored in a forwarding table, storing the source address in a forwarding table associated with the bridge, wherein the storing step is further conditioned on whether the frame was received within a time window $T_w$ of when a threshold number of previous frames were received at the port and their addresses were stored in the table.

16. The method of claim 15 and further comprising adjusting the threshold number at different times.

17. The method of claim 15 and further comprising adjusting the time window $T_w$ at different times.

18. The method of claim 17 and further comprising the steps of:
    determining whether a plurality of source addresses in the forwarding table are authentic; and
    in response to the determining step, the steps of:
       providing an authentic indication in the table for each source address in the table determined to be authentic; and
       permitting an overwriting of each source address in the table determined to be unauthentic.

19. The method of claim 18 wherein the at least one condition further comprises whether a number of source addresses having an inauthentic indication in the table exceed a threshold.

20. The method of claim 15 and further comprising the steps of:
    determining whether a plurality of source addresses in the forwarding table are authentic; and
    in response to the determining step, the steps of:
       providing an authentic indication in the table for each source address in the table determined to be authentic; and
       permitting an overwriting of each source address in the table determined to be unauthentic.

21. The method of claim 20 wherein the at least one condition further comprises whether a number of source addresses having an inauthentic indication in the table exceed a threshold.

22. A bridge node in a network system, the bridge node comprising:
- a plurality of ports, wherein each port is operable to receive a frame from a device in the network system and other than the bridge node, the frame comprising a source network address; and
- circuitry, responsive to at least one condition associated with the port, for storing the source address in a forwarding table associated with the bridge if the at least one condition is satisfied, wherein the at least one condition comprises whether the frame was received within a time window $T_w$ and the number of frames that were received at the port within the time window $T_w$ and whose respective source network addresses were stored in the table does not exceed a threshold number.

23. The node of claim 22 wherein the at least one condition further comprises whether the source address is different from each and any source address, previously-received in a respective frame at the port, already stored in the forwarding table.

24. A bridge node in a network system, the bridge node comprising:
- a plurality of ports, wherein each port is operable to receive a frame from a device in the network system and other than the bridge node, the frame comprising a source network address; and
- circuitry, conditioned on whether the source address is different from each and any source address, previously-received in a respective frame at the port, already stored in a forwarding table, for storing the source address in a forwarding table associated with the bridge if the at least one condition is satisfied, wherein the circuitry for storing is further conditioned on whether the frame was received within a time window $T_w$ and the number of frames that were received at the port within the time window $T_w$ and whose respective source network addresses were stored in the table does not exceed a threshold number.

25. The node of claim 24 and further comprising circuitry for:
- determining whether a plurality of source addresses in the forwarding table are authentic; and
- in response to the determining circuitry, circuitry for:
  - providing an authentic indication in the table for each source address in the table determined to be authentic; and
  - permitting an overwriting of each source address in the table determined to be unauthentic.

26. A method of operating a bridge node in a network system, the bridge node comprising a plurality of ports, the method comprising:
- receiving a frame, from a device in the network system and other than the bridge node, at a port in the plurality of ports, the frame comprising a source network address;
- responsive to at least one condition associated with the port, storing the source address in a forwarding table associated with the bridge if the at least one condition is satisfied;
- wherein the at least one condition comprises whether the frame was received within a time window $T_w$ of when a threshold number of previous frames were received at the port and their respective source network addresses were stored in the table;
- wherein the bridge determining whether a plurality of source addresses in the forwarding table are authentic, wherein in response to the determining step, the steps of:
  - providing an authentic indication in the table for each source address in the table determined to be authentic; and
  - permitting an overwriting of each source address in the table determined to be unauthentic; and
- wherein the at least one condition further comprises whether a number of source addresses having an inauthentic indication in the table exceed a threshold.

27. A method of operating a bridge node network system, the bridge node comprising a plurality of ports, the method comprising:
- receiving a frame, from a device in the network system and other than the bridge node, at a port in the plurality of ports, the frame comprising a source network address;
- responsive to at least one condition associated with the port, storing the source address in a forwarding table associated with the bridge if the at least one condition is satisfied;
- wherein the at least one condition comprises whether the frame was received within a time window $T_w$ of when a threshold number of previous frames were received at the port and their respective source network addresses were stored in the table;
- wherein the bridge determining whether a plurality of source addresses in the forwarding table are authentic;
- responsive to the at least one condition associated with the port, storing a set of parameters associated with the frame, the set of parameters consisting of an identifier of the port and an identifier of a time of receipt of the frame.

28. A method of operating a bridge node in a network system, the bridge node comprising a plurality of ports, the method comprising:
- receiving a frame, from a device in the network system and other than the bridge node, at a port in the plurality of ports, the frame comprising a source network address;
- conditioned on whether the source address is different from each and any source address, previously-received in a respective frame at the port, already stored in a forwarding table, storing the source address in the forwarding table associated with the bridge;
- wherein the storing step is further conditioned on whether tie frame was received within a time window $T_w$ of when a threshold number of previous frames were received at the port and their addresses were stored in the table;
- adjusting the time window $T_w$ at different times;
- determining whether a plurality of source addresses in the forwarding table are authentic; and
- in response to the determining step, the steps of:
  - providing an authentic indication in the table for each source address in the table determined to be authentic, and
  - permitting an overwriting of each source address in the table determined to be unauthentic; and
- wherein the at least one condition further comprises whether a number of source addresses having, an inauthentic indication in the table exceeds a threshold.

29. A method of operating a bridge node in a network system, the bridge node comprising a plurality of ports, the method comprising:
- receiving a frame, from a device in the network system and other than the bridge node, at a port in the plurality of ports, the flame comprising a source network address;
- conditioned on whether the source address is different from each and any source address, previously-received in a respective frame at the port, already stored in a forwarding table, storing the source address in the forwarding table associated with the bridge;

determining whether a plurality of source addresses in the forwarding table are authentic; and in response to the determining step, the steps of:

providing an authentic indication in the table for each source address in the table determined to be authentic; and permitting an overwriting of each source address in the table determined to be unauthentic; and wherein the at least one condition further comprises whether a number of source addresses having an inauthentic indication in the table exceed a threshold.

* * * * *